(12) United States Patent
Alibakhshi et al.

(10) Patent No.: US 11,873,418 B2
(45) Date of Patent: Jan. 16, 2024

(54) WEATHERING-RESISTANT NANOCOMPOSITE COATING

(71) Applicants: Eiman Alibakhshi, Tehran (IR); Bahram Ramezanzade Karati, Tehran (IR); Mohammad Mahdavian Ahadi, Tehran (IR); Mohammad Ramezanzadeh Karati, Tehran (IR)

(72) Inventors: Eiman Alibakhshi, Tehran (IR); Bahram Ramezanzade Karati, Tehran (IR); Mohammad Mahdavian Ahadi, Tehran (IR); Mohammad Ramezanzadeh Karati, Tehran (IR)

(73) Assignees: ATLAS PROTECTING COATING, Tehran (IR); AZARAN FAZA NAMA, Tehran (IR)

( * ) Notice: Subject to any disclaimer, the term of this patent is extended or adjusted under 35 U.S.C. 154(b) by 133 days.

(21) Appl. No.: 17/191,948

(22) Filed: Mar. 4, 2021

(65) Prior Publication Data
US 2021/0189155 A1   Jun. 24, 2021

Related U.S. Application Data

(60) Provisional application No. 62/986,637, filed on Mar. 7, 2020.

(51) Int. Cl.
| | | |
|---|---|---|
| *C09D 5/00* | (2006.01) | |
| *C09D 7/40* | (2018.01) | |
| *C09D 133/08* | (2006.01) | |
| *C09D 7/62* | (2018.01) | |
| *C09D 175/16* | (2006.01) | |
| *C09D 7/42* | (2018.01) | |
| *C09D 7/80* | (2018.01) | |
| *C09D 163/00* | (2006.01) | |
| *B82Y 40/00* | (2011.01) | |
| *B82Y 30/00* | (2011.01) | |

(52) U.S. Cl.
CPC ............... *C09D 7/62* (2018.01); *C09D 5/00* (2013.01); *C09D 7/42* (2018.01); *C09D 7/80* (2018.01); *C09D 163/00* (2013.01); *C09D 175/16* (2013.01); *B82Y 30/00* (2013.01); *B82Y 40/00* (2013.01)

(58) Field of Classification Search
None
See application file for complete search history.

(56) References Cited

FOREIGN PATENT DOCUMENTS

| CN | 104910752 A | * | 9/2015 | ........... C09D 163/00 |
| CN | 105820708 A | * | 8/2016 | ........... C09D 163/00 |
| CN | 106675281 A | * | 5/2017 | ............... C08F 2/30 |
| CN | 109266165 A | * | 1/2019 | ........... C09D 163/00 |

OTHER PUBLICATIONS

Machine translation of CN-109266165-A (no date).*
Machine translation of CN-106675281-A (no date).*
Machine translation of CN-104910752-A (no date).*
Machine translation of CN-105820708-A (no date).*

* cited by examiner

*Primary Examiner* — Michael J Feely
(74) *Attorney, Agent, or Firm* — Bajwa IP Law Firm; Haris Zaheer Bajwa

(57) ABSTRACT

An ultraviolet (UV)-resistant nanocomposite coating may include a polyaniline (PANI)/graphene oxide (GO) nanocomposite. The PANI/GO nanocomposite may include GO nanosheets that may be coated with PANI. The PANI/GO nanocomposite may be dispersed into a binding matrix.

15 Claims, 1 Drawing Sheet

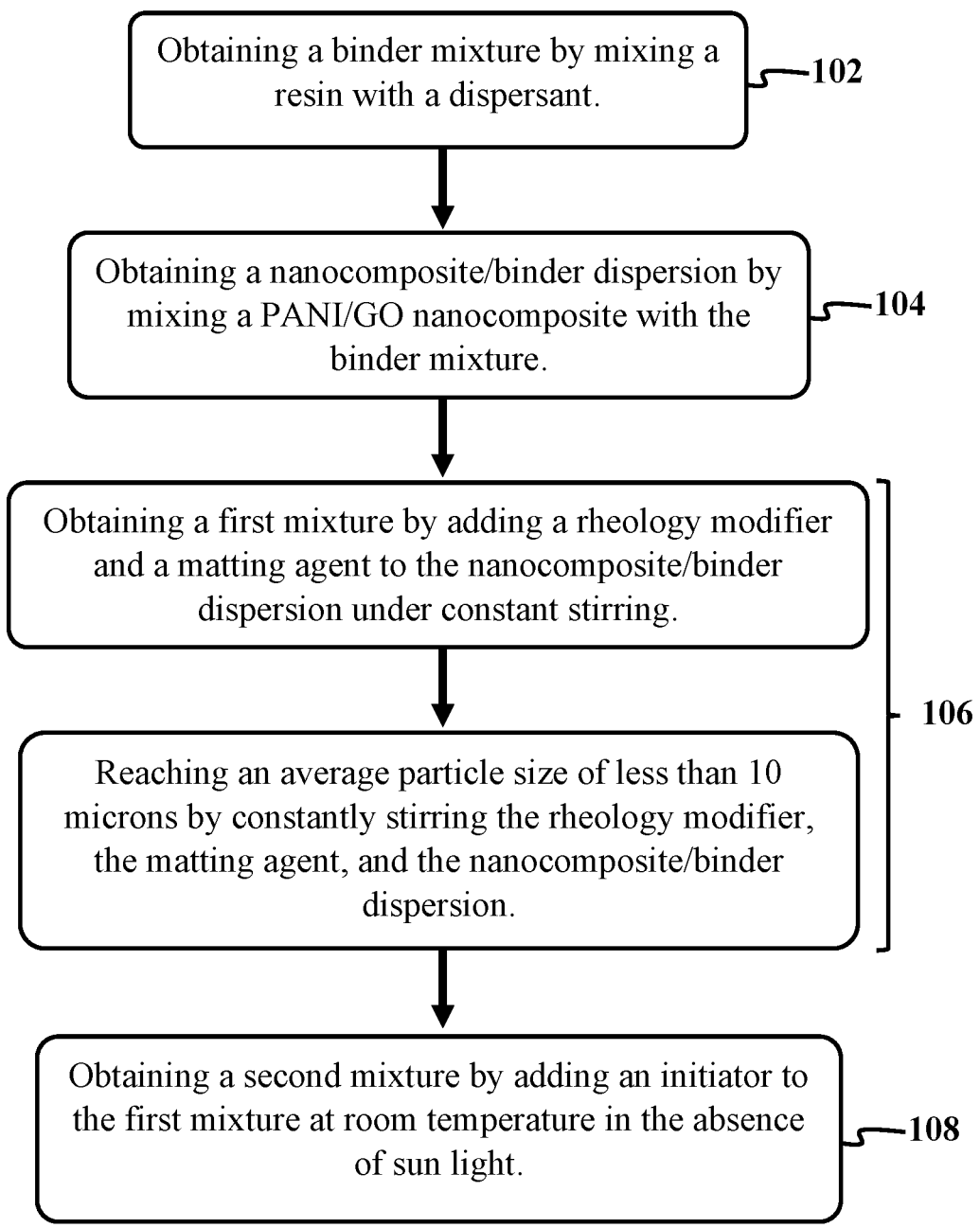

WEATHERING-RESISTANT NANOCOMPOSITE COATING

CROSS-REFERENCE TO RELATED APPLICATION

This application claims the benefit of priority from U.S. Provisional Patent Application Ser. No. 62/986,637, filed on Mar. 7, 2020, and entitled "WEATHERING RESISTANT NANOCOMPOSITE COATING FOR POLYVINYLE CHLORIDE CLADDING PANELS," which is incorporated herein by reference in its entirety.

TECHNICAL FIELD

The present disclosure relates to nanocomposite coatings, particularly to weathering-resistant nanocomposite coating preparations for cladding panels. More particularly, the present disclosure relates to weathering-resistant nanocomposite coatings for cladding panels made of rigid polyvinyl chloride (PVC).

BACKGROUND

The weak weathering resistance of polyvinyl chloride (PVC) cladding panels in outdoor applications may lead to color change, exfoliation, and failure in the PVC cladding panels due to photo-oxidation/degradation reactions. Consequently, protection of PVC cladding panels against atmospheric conditions, such as severe ultraviolet (UV) irradiation on a sunny day or severely humid conditions on a rainy day is of great importance.

Organic UV-absorbers, together with radical scavenging compounds may be used to protect coating systems against the aforementioned severe UV irradiation/humid conditions. Such organic UV-absorbers are based on triazine, benzotriazoles, and benzophenones, which may lose their anti-UV performance during service time due to the possibility of UV-absorbent release from the coating. Therefore, organic UV absorbers have been substituted by inorganic UV blocking agents.

Inorganic UV blocking agents, such as $TiO_2$, ZnO, and $CeO_2$ may be able to protect the coating against weathering conditions through UVB (280-315 nm) absorbance, reflection, or scattering mechanisms due to their high refractive index. However, inorganic UV blocking agents may also have some drawbacks, such as improper dispersion in polymeric matrices and also an inadequate ability to absorb hydroxyl groups. For example, to disperse titanium dioxide ($TiO_2$) into the polymeric matrix of PVC panels, high loading of titanium dioxide is required, which is undesirable from a production point of view due to the high cost. Such drawbacks may lead to loss of coating quality over time.

Another approach for protecting PVC cladding panels against outdoor weathering conditions may be utilizing UV-curing coatings. Such UV-curing coatings may include UV absorbers and UV blocking agents. However, these UV absorbers and blocking agents may interfere with the curing reaction of a UV-curing coatings under UV radiation. Furthermore, these UV-curing coatings need to be improved to be more environmentally friendly, to be more cost-effective, and to have a longer service life. Consequently, there is a need for a UV-curing coating that may be anti-scratch, easy to clean, long-lasting, and cost-effective.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to an ultraviolet (UV)-resistant nanocomposite coating. An exemplary UV-resistant nanocomposite coating may include a polyaniline (PANI)/graphene oxide (GO) nanocomposite. An exemplary PANI/GO nanocomposite may include GO nanosheets that may be coated with PANI. An exemplary PANI/GO nanocomposite may be dispersed into a binding matrix.

According to one or more exemplary embodiments, the present disclosure is further directed to a method for preparing a UV-resistant nanocomposite coating. An exemplary method may include obtaining a binder mixture by mixing a resin with a dispersant and obtaining a nanocomposite/binder dispersion by mixing a PANI/GO nanocomposite with an exemplary binder mixture.

An exemplary method may further include obtaining a first mixture by adding a rheology modifier and a matting agent to an exemplary nanocomposite/binder dispersion under constant stirring and reaching an average particle size of less than 10 microns by constantly stirring an exemplary rheology modifier, an exemplary matting agent, and an exemplary nanocomposite/binder dispersion. An exemplary method may further include obtaining an exemplary UV-resistant coating by adding an initiator to an exemplary first mixture at room temperature in the absence of sunlight.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which:

FIG. 1 illustrates a flowchart of a method for preparing a UV-resistant nanocomposite coating, consistent with one or more exemplary embodiments of the present disclosure.

DETAILED DESCRIPTION

The novel features which are believed to be characteristic of the present disclosure, as to its structure, organization, use and method of operation, together with further objectives and advantages thereof, will be better understood from the following discussion.

The present disclosure is directed to exemplary embodiments of a UV-resistant nanocomposite coating and a method for synthesizing an exemplary UV-resistant nanocomposite coating. An exemplary UV-resistant nanocomposite coating may include polyaniline (PANI)/graphene oxide (GO) nanocomposite that may impart weathering resistance properties to an exemplary UV-resistant nanocomposite coating. Such UV-resistant nanocomposite coating may be applied on a target surface, for example, on an external surface of a polyvinyl chloride (PVC) cladding panel to protect the panel from color change, exfoliation, and failure due to photo-degradation.

FIG. 1 illustrates a flowchart of a method 100 for preparing a UV-resistant nanocomposite coating, consistent with one or more exemplary embodiments of the present disclosure. In an exemplary embodiment, method 100 may include a step 102 of obtaining a binder mixture by mixing a resin with a dispersant, a step 104 of obtaining a nanocomposite/binder dispersion by mixing a PANI/GO nanocomposite with the binder mixture, a step 106 of obtaining a first mixture by adding a rheology modifier and a matting agent to the nanocomposite/binder dispersion under constant stirring and reaching an average particle size of less than 10 microns by constantly stirring the rheology modifier, the matting agent, and the nanocomposite/binder dispersion, and a step 108 of obtaining a second mixture by adding an initiator to the first mixture at room temperature in the absence of sunlight. In an exemplary embodiment, the second mixture may be utilized as a UV-resistant nanocomposite coating.

In an exemplary embodiment, step 102 of obtaining the binder mixture may include mixing a resin with a dispersant in a mixing device, such as a mechanical mixer. In an exemplary embodiment, a binder such as a resin may be poured into the mixing device and then a dispersant may be added to the binder and mixed with the binder utilizing the mixing device. For example, step 102 of obtaining the binder mixture may include mixing a binder with a dispersant in a mechanical mixer at a stirring rate of 1000 rpm to 3000 rpm for a period of 15 to 60 minutes.

As used herein, a binder or binding agent may refer to organic binders, such as resins that may hold coating materials together to form a cohesive UV-resistant coating composition both mechanically and chemically. In an exemplary embodiment, the binder may be utilized as the matrix in an exemplary UV-resistant nanocomposite coating. In an exemplary embodiment, step 102 of obtaining the binder mixture may include mixing a resin, such as at least one of an epoxy acrylate resin and a urethane acrylate resin with a dispersant.

As used herein, a dispersant or a dispersing agent may refer to materials, such as dibasic esters or siloxanes that may be added to an exemplary UV-resistant coating composition to prevent flocculation. An exemplary UV-resistant coating composition is basically a colloidal dispersion, which is inherently unstable and needs to be stabilized. As used herein, stabilizing a colloidal dispersion may refer to preventing colloids from coming out of suspension in the form of agglomerates or sediments. In an exemplary embodiment, step 102 of obtaining the binder mixture may include mixing a resin, such as at least one of an epoxy acrylate resin and a urethane acrylate resin with a dispersant, such as a dibasic ester or a siloxane with a weight ratio (dispersant:resin) between 1:60 and 1:22.

In an exemplary embodiment, step 104 of obtaining the nanocomposite/binder dispersion may include mixing a PANI/GO nanocomposite with the binder mixture obtained in step 102. In an exemplary embodiment, PANI/GO nanocomposite powder may be added to the binder mixture within a mixing device and then may be mixed with the binder mixture at a stirring rate of 1000 rpm to 3000 rpm for a period of 8 to 24 hours. As used herein, PANI/GO nanocomposite may refer to a nanocomposite, in which GO nanosheets are coated with PANI. In an exemplary embodiment, step 104 of obtaining the nanocomposite/binder dispersion may include mixing the PANI/GO nanocomposite with the binder mixture with a weight ratio (PANI/GO nanocomposite:binder mixture) between 1:600 and 1:45.

In an exemplary embodiment, PANI/GO nanocomposite may be synthesized by adding aniline monomers to an HCl solution and then stirring the solution to reach a homogeneous solution. After that, a prepared dispersion of GO in deionized water may be poured into the homogeneous solution at once under nitrogen purging. The obtained mixture may then be stirred at room temperature for one week and then may be centrifuged and washed to remove the impurities.

For example, PANI/GO nanocomposite may be synthesized by adding 1 mL of aniline monomers to 10 cm$^3$ of a 1M HCl solution and then stirring the solution for 10 minutes to reach a homogeneous solution. After that, 0.2 g of a prepared dispersion of GO in deionized water may be poured into the homogeneous solution at once under nitrogen purging. The obtained mixture may then be stirred at room temperature for one week and then may be centrifuged and washed to remove the impurities.

In an exemplary embodiment, PANI/GO nanocomposite may first be dispersed in a solvent, such as at least one of methylethylketone, methyl isobutyl ketone, and toluene, and then may be added to the binder mixture. In an exemplary embodiment, dispersing the PANI/GO nanocomposite in the solvent may include adding PANI/GO nanocomposite to the solvent and then sonicating the mixture to obtain a colloidal dispersion of PANI/GO nanocomposite in the solvent.

In an exemplary embodiment, step 106 of obtaining the first mixture may include adding a rheology modifier and a matting agent to the nanocomposite/binder dispersion obtained in step 104 under constant stirring and reaching an average particle size of less than 10 microns by constantly stirring the rheology modifier, the matting agent, and the nanocomposite/binder dispersion. In an exemplary embodiment, obtaining the first mixture may include adding the matting agent to the mixing device and then adding the rheology modifier to the mixing device onto the nanocomposite/binder dispersion. After that, the obtained mixture of the nanocomposite/binder dispersion, matting agent, and rheology modifier may be stirred in the mixing device at a stirring rate of 1000 rpm to 3000 rpm.

As used herein, a matting agent may refer to a paint additive such as silica or polyolefin waxes that may be added to a coating composition to adjust the degree of matt/gloss of the coating composition. There is no need for adding a matting agent to produce a glossy coating, however, to produce a matte coating, a matting agent must be added to the coating composition. In an exemplary embodiment, step 106 of obtaining the first mixture may include adding a matting agent, such as at least one of silica and polyolefin waxes to the nanocomposite/binder dispersion under constant stirring at a stirring rate of 1000 rpm to 3000 rpm.

As used herein, a rheology modifier may refer to a thickener or a viscosity modifier, such as fumed silica and bentonite. In an exemplary embodiment, step 106 of obtaining the first mixture may further include adding a rheology modifier, such as at least one of fumed silica and bentonite to the nanocomposite/binder dispersion under constant stirring at a stirring rate of 1000 rpm to 3000 rpm. In an exemplary embodiment, a matting agent may be added to the nanocomposite/binder dispersion in an amount such that the matting agent may be present in the final UV-resistant nanocomposite coating with a concentration between 5 wt. % to 20 wt. % based on total weight of the final UV-resistant nanocomposite coating. In an exemplary embodiment, rheology modifier may be added to the nanocomposite/binder dispersion in an amount such that the rheology modifier may be present in the final UV-resistant nanocomposite coating with a concentration between 0.5 wt. % to 5 wt. % based on total weight of the final UV-resistant nanocomposite coating.

In an exemplary embodiment, samples may be collected from the first mixture at different times while the first mixture is being stirred within the mixing device. The aforementioned samples may then be examined utilizing a grindometer to determine an average particle size of each sample. In an exemplary embodiment, constant stirring of the first mixture may be carried out to the point, where a sample collected at that point from the first mixture may include particles with an average size of less than 10 microns based on the analysis performed by the grindometer.

In an exemplary embodiment, step 108 of obtaining the second mixture may include adding an initiator to the first mixture at room temperature in the absence of sunlight. To this end, a specific amount of an initiator may be added to the first mixture, such that the initiator may have a concentration of 0.5-2 wt. % based on the total weight of the second mixture. In an exemplary embodiment, adding the initiator to the first mixture may include adding the initiator to the mixing device containing the first mixture and then mixing the initiator with the first mixture at a stirring rate of 1000 rpm to 3000 rpm away from sunlight. In an exemplary embodiment, the initiator may include at least one of azobisisobutyronitrile, trimethylolpropane triacrylate, and trimethyl benzoyl diphenyl phosphine oxide.

In an exemplary embodiment, the second mixture obtained in step 108 may be utilized as a UV-resistant nanocomposite coating. For example, the second mixture may be applied on a target surface by a roller or a brush. Alternatively, the second mixture may be applied on a target surface by spraying the second mixture onto the target surface. In an exemplary embodiment, the second mixture obtained in step 108 may be applied with a thickness of 0.1 to 20 microns on a target surface as a UV-resistant nanocomposite coating.

In an exemplary embodiment, the second mixture obtained in step 108 may be utilized as a UV-resistant nanocomposite coating on a PVC cladding panel. Utilizing PVC cladding panels in outdoor applications may lead to color change, exfoliation, and failure due to photo-degradation reactions. In an exemplary embodiment, an exemplary UV-resistant nanocomposite coating may protect such outdoor PVC cladding panels from color change, exfoliation, and photo-degradation. In an exemplary embodiment, UV-resistant nanocomposite coating may be diluted to a 40 to 80 wt. % solution of UV-resistant nanocomposite coating in a solvent, such as methylethylketone, and then may be applied on an outer surface of a PVC cladding panel by a roller. After that, the PVC cladding panel covered in UV-resistant nanocomposite coating may be subjected to a UV curing step.

According to one or more exemplary embodiments, the present disclosure is further related to a UV-resistant nanocomposite coating that may be prepared by a method, such as method 100. In an exemplary embodiment, the UV-resistant nanocomposite coating may include a polyaniline (PANI)/graphene oxide (GO) nanocomposite that is dispersed into a binding matrix. As mentioned before, a PAN/GO nanocomposite may include GO nanosheets that are coated with PANI. In an exemplary embodiment, the binding matrix may include at least one of an epoxy acrylate resin and a urethane acrylate resin.

In an exemplary embodiment, the UV-resistant nanocomposite coating may further include a matting agent, a rheology modifier, a dispersant, and an initiator. In an exemplary embodiment, the matting agent may include at least one of silica and polyolefin waxes. In an exemplary embodiment, the rheology modifier may include at least one of fumed silica and bentonite. In an exemplary embodiment, the dispersant may include at least one of dibasic esters and siloxane. In an exemplary embodiment, the initiator may include at least one of azobisisobutyronitrile, trimethylolpropane triacrylate, and trimethyl benzoyl diphenyl phosphine oxide.

In an exemplary embodiment, the UV-resistant nanocomposite coating may include 60-90 wt. % of the binding matrix, 0.1-2 wt. % of PANI/GO nanocomposite, 5-20 wt. % of the matting agent, 0.5-5 of the rheology modifier, 1-4 wt. % of the dispersant, and 0.5-2 wt. % of the initiator.

EXAMPLE 1

In this example, a UV-resistant nanocomposite coating was synthesized based on method 100, where the UV-resistant nanocomposite coating included 83.9 wt. % of a urethane acrylate binder, 6.2 wt. % of micro silica with an average particle size of 5 microns, 4.7 wt. % of fumed silica, 2.6 wt. % of a dibasic ester, 2.1 wt. % of trimethylolpropane triacrylate, and 0.5 wt. % of PANI/GO nanocomposite. Another reference sample was prepared without adding the PANI/GO nanocomposite for comparison. Here, to compare weathering resistance of the coating, the synthesized UV-resistant nanocomposite coating with the composition described above and the reference sample were applied onto respective PVC cladding panels utilizing a roller with a film thickness of approximately 1 micron.

In this example, an accelerated weathering test (QUV test) was carried out on both the PVC panel coated with a UV-resistant nanocomposite coating and the reference sample. In this test, a contact angle test was performed for both samples, and the results showed that the contact angle for the reference sample changes from 75° before the QUV test to 57° after 200 hours of the QUV test. The results further showed that the contact angle for the UV-resistant nanocomposite coated sample changes from 88° before the QUV test to 80° after 200 hours of the QUV test.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps. Moreover, the word "substantially" when used with an adjective or adverb is intended to enhance the scope of the particular characteristic, e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. An ultraviolet (UV)-resistant nanocomposite coating, comprising:
    a polyaniline (PANI)/graphene oxide (GO) nanocomposite comprising GO nanosheets coated with PANI, the PANI/GO nanocomposite dispersed into a binding matrix;
    a matting agent comprising at least one of silica and polyolefin waxes;
    a rheology modifier comprising at least one of fumed silica and bentonite;
    a dispersant comprising at least one of dibasic esters and siloxane; and
    an initiator comprising at least one of azobisisobutyronitrile, trimethylolpropane triacrylate, and trimethyl benzoyl diphenyl phosphine oxide,
    wherein:
        the binding matrix comprises at least one of an epoxy acrylate resin and a urethane acrylate resin; and
        a weight ratio of PANI/GO nanocomposite to the binding matrix is in a range of 1:600 to 1:45.

2. The UV-resistant nanocomposite coating of claim 1, comprising:
    60-90 wt. % of the binding matrix;
    0.1-2 wt. % of PANI/GO nanocomposite;
    5-20 wt. % of the matting agent;
    0.5-5 wt. % of the rheology modifier;
    1-4 wt. % of the dispersant; and
    0.5-2 wt. % of the initiator.

3. An ultraviolet (UV)-resistant nanocomposite coating, comprising:
    a polyaniline (PANI)/graphene oxide (GO) nanocomposite comprising GO nanosheets coated with PANI, the PANI/GO nanocomposite dispersed into a binding matrix;
    a matting agent comprising at least one of silica and polyolefin waxes; and
    an initiator comprising at least one of azobisisobutyronitrile, trimethylolpropane triacrylate, and trimethyl benzoyl diphenyl phosphine oxide.

4. The ultraviolet (UV)-resistant nanocomposite coating of claim 3, further comprising a rheology modifier comprising at least one of fumed silica and bentonite.

5. The ultraviolet (UV)-resistant nanocomposite coating of claim 4, further comprising a dispersant comprising at least one of dibasic esters and siloxane.

6. The ultraviolet (UV)-resistant nanocomposite coating of claim 3, further comprising a dispersant comprising at least one of dibasic esters and siloxane.

7. An ultraviolet (UV)-resistant nanocomposite coating, comprising:
    a polyaniline (PANI)/graphene oxide (GO) nanocomposite comprising GO nanosheets coated with PANI, the PANI/GO nanocomposite dispersed into a binding matrix;
    a matting agent;
    a rheology modifier;
    a dispersant; and
    an initiator,
    wherein:
        a concentration of the binding matrix is in a range between 60 wt. % and 90 wt. %;
        a concentration of the PANI/GO nanocomposite is in a range between 0.1 wt. % and 2 wt. %;
        a concentration of the matting agent is in a range between 5 wt. %-20 wt. %;
        a concentration of the rheology modifier is in a range between 0.5 wt. %-5 wt. %;
        a concentration of the dispersant is in a range between 1 wt. %-4 wt. %; and
        a concentration of the initiator is in a range between 0.5 wt. %-2 wt. %.

8. The ultraviolet (UV)-resistant nanocomposite coating of claim 7, wherein the matting agent comprises at least one of silica and polyolefin waxes.

9. The ultraviolet (UV)-resistant nanocomposite coating of claim 7, wherein the rheology modifier comprises at least one of fumed silica and bentonite.

10. The ultraviolet (UV)-resistant nanocomposite coating of claim 7, wherein the dispersant comprises at least one of dibasic esters and siloxane.

11. The ultraviolet (UV)-resistant nanocomposite coating of claim 7, wherein the initiator comprises at least one of azobisisobutyronitrile, trimethylolpropane triacrylate, and trimethyl benzoyl diphenyl phosphine oxide.

12. The ultraviolet (UV)-resistant nanocomposite coating of claim 7, wherein:
    the dispersant comprises at least one of dibasic esters and siloxane; and
    the rheology modifier comprises at least one of fumed silica and bentonite.

13. The ultraviolet (UV)-resistant nanocomposite coating of claim 7, wherein:
    the initiator comprises at least one of azobisisobutyronitrile, trimethylolpropane triacrylate, and trimethyl benzoyl diphenyl phosphine oxide; and
    the rheology modifier comprises at least one of fumed silica and bentonite.

14. The ultraviolet (UV)-resistant nanocomposite coating of claim 7, wherein:
    the initiator comprises at least one of azobisisobutyronitrile, trimethylolpropane triacrylate, and trimethyl benzoyl diphenyl phosphine oxide; and
    the dispersant comprises at least one of dibasic esters and siloxane.

15. The ultraviolet (UV)-resistant nanocomposite coating of claim 7, wherein:
    the rheology modifier comprises at least one of fumed silica and bentonite;
    the initiator comprises at least one of azobisisobutyronitrile, trimethylolpropane triacrylate, and trimethyl benzoyl diphenyl phosphine oxide; and
    the dispersant comprises at least one of dibasic esters and siloxane.

* * * * *